United States Patent
Matsushita et al.

(10) Patent No.: US 8,713,993 B2
(45) Date of Patent: May 6, 2014

(54) METHOD AND APPARATUS FOR INSPECTING PINHOLE IN SYNTHETIC RESIN BOTTLE

(75) Inventors: Yousuke Matsushita, Yokohama (JP); Noboru Sawane, Yokohama (JP); Yasushi Oobuchi, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 858 days.

(21) Appl. No.: 12/739,581

(22) PCT Filed: Oct. 29, 2008

(86) PCT No.: PCT/JP2008/069646
§ 371 (c)(1),
(2), (4) Date: Apr. 23, 2010

(87) PCT Pub. No.: WO2009/057636
PCT Pub. Date: May 7, 2009

(65) Prior Publication Data
US 2010/0257919 A1    Oct. 14, 2010

(30) Foreign Application Priority Data

Oct. 29, 2007  (JP) ................... 2007-279983
Nov. 14, 2007  (JP) ................... 2007-295033
Dec. 7, 2007   (JP) ................... 2007-317022

(51) Int. Cl.
*G01M 3/34* (2006.01)

(52) U.S. Cl.
USPC ............. 73/49.3; 73/45.1; 73/45.4; 73/52

(58) Field of Classification Search
USPC .............. 73/49.6, 52, 40–49.3, 41, 45, 45.1, 73/45.2, 45.4
See application file for complete search history.

(56) References Cited

U.S. PATENT DOCUMENTS 4,399,514 A * 8/1983 Hamasaki et al. ............ 702/140
5,614,661 A * 3/1997 Balordi ........................ 73/49.3
(Continued)

FOREIGN PATENT DOCUMENTS

DE  42 39 238 A1   5/1994
DE  4239238   *   5/1994
(Continued)

OTHER PUBLICATIONS

Notification of Transmittal of Translation of the International Preliminary Report on Patentability (Form PCT/IB/338) of International Application No. PCT/JP2008/069646 mailed Jun. 10, 2010 with Forms PCT/IB/373 and PCT/ISA/237.

(Continued)

*Primary Examiner* — Hezron E Williams
*Assistant Examiner* — Hoang Nguyen
(74) *Attorney, Agent, or Firm* — Westerman, Hattori, Daniels & Adrian, LLP

(57) ABSTRACT

Provided is a pinhole inspecting method for suitably inspecting a pinhole in a bottle compared with conventional pinhole inspection. A reference inner pressure ($P_1$) is a bottle inner pressure obtained directly after closing a supply valve (3) after opening the supply valve (3) for only a predetermined time. Whether the reference inner pressure ($P_1$) is over a previously specified first threshold value ($P_{th1}$) or not is checked, and when it exceeds the first threshold value ($P_{th1}$), airtight status of the bottle is held for a predetermined time, and then a pressure reduction quantity ($\Delta P$) of the bottle inner pressure from the reference inner pressure is measured after a fixed time. The bottle is judged to have no pinholes only when the value of $\Delta P$ is not exceeding the previously specified second threshold value ($\Delta P_{th2}$).

4 Claims, 13 Drawing Sheets

(56) References Cited

U.S. PATENT DOCUMENTS

| | | | | |
|---|---|---|---|---|
| 5,915,270 A | * | 6/1999 | Lehmann | 73/49.2 |
| 6,067,844 A | * | 5/2000 | Westbrook et al. | 73/40.5 R |
| 6,918,285 B2 | * | 7/2005 | Chevalier et al. | 73/49.3 |
| 6,993,957 B2 | * | 2/2006 | Kano et al. | 73/49.7 |
| 7,594,424 B2 | * | 9/2009 | Fazekas | 73/37 |
| 2003/0206991 A1 | * | 11/2003 | Godwin et al. | 425/549 |
| 2004/0250604 A1 | | 12/2004 | Watanabe et al. | |
| 2005/0115306 A1 | * | 6/2005 | Lehmann | 73/49.3 |
| 2006/0169026 A1 | * | 8/2006 | Kage et al. | 73/38 |
| 2008/0061240 A1 | * | 3/2008 | Heuft | 250/343 |
| 2008/0217823 A1 | * | 9/2008 | Kubacki et al. | 264/524 |

FOREIGN PATENT DOCUMENTS

| | | | |
|---|---|---|---|
| DE | 4239238 A1 | * | 5/1994 |
| JP | 64-35340 A | | 2/1989 |
| JP | 08-015080 | * | 1/1996 |
| JP | 8-15080 A | | 1/1996 |
| JP | 9-68474 A | | 3/1997 |
| JP | 2002-310843 A | | 10/2002 |
| JP | 2004-26435 A | | 1/2004 |
| JP | 2004-205453 A | | 7/2004 |
| JP | 2006-137109 A | * | 11/2004 |
| JP | 2006137109 A | * | 11/2004 |
| JP | 2005-2965 A | | 1/2005 |
| WO | 2004/077006 A1 | | 9/2004 |

OTHER PUBLICATIONS

International Search Report of PCT/JP2008/069646, mailing date of Jan. 20, 2009.

European Search Report dated Nov. 2, 2010, issued in corresponding European Patent Application No. 08845905.2.

* cited by examiner

METHOD AND APPARATUS FOR INSPECTING PINHOLE IN SYNTHETIC RESIN BOTTLE

TECHNICAL FIELD

The present invention relates to a method and apparatus for inspecting for pinholes in synthetic resin bottles, and more particularly, to a method and apparatus for inspecting for pinholes in synthetic resin bottles capable of preferably detecting pinholes in bottles and improving the accuracy of pinhole inspections of synthetic resin bottles as compared with conventional pinhole inspections when inspecting pinholes in blow-molded synthetic resin bottles.

BACKGROUND ART

Synthetic resin bottles, and particularly PET bottles, have recently been produced in large volume for use as containers for beverages, foods and the like due to their light weight and handling ease.

PET bottles are obtained by so-called biaxial stretch blow molding consisting of first producing a primary molded article as a preform by injection molding, next placing the preform in a predetermined metal mold, heating the preform with a heater or other heating means to a temperature that allows the preform to be oriented and stretched, inserting a stretching rod thereinto that injects high-pressure air, and stretching the preform biaxially with the stretching rod and the high-pressure air. Since the biaxial stretch blow molding stretches the heated preform in an axial direction and a direction perpendicular thereto with the stretching rod, PET bottles may be produced having defects such as pinholes or cracks due to slight differences in processing force (stretching force) and contamination of extremely small particles in the resin material. Thus, PET bottles after blow molding requires an inspection to determine whether or not there are pinholes or other defects therein. A known example of an inspection method for this purpose consists of filling air in a PET bottle clamped along the outer periphery of a main rotor, sealing the air inside the bottle by contacting a pressure head with the mouth of the bottle, maintaining this airtight status for a fixed amount of time, and then assessing the bottle for the presence of pinholes based on a inner pressure reduction quantity of the bottle in elapse of the fixed amount of time (see, for example, Patent Document 1 and Patent Document 2).

FIG. 13 is a graph indicating a conventional pinhole inspection method in which the presence of pinholes is assessed based on a pressure reduction quantity. Bottle inner pressure [kPa] is plotted on the vertical axis, while valve sequence/time [sec] is plotted on the horizontal axis.

In this pinhole inspection method, air is supplied inside a bottle by opening a supply value at a time $T=t_0$, for example. Next, the supply of air is stopped by closing the supply valve at a time $T=t_1$, and a predetermined amount of air is sealed in the bottle. The airtight status is then held until a time $T=t_2$. In presence of such a defect as a pinhole that breaks the air tight of the bottle, air flows to the outside of the bottle through the defect, which correspondingly results in a reduction of bottle inner pressure. However, as the temperature inside the bottle gradually lowers, the bottle inner pressure decreases in proportion thereto. In addition, bottle inner pressure also decreases due to slight swelling of the body of the bottle to the outside due to a rise in inner pressure. In other words, bottle inner pressure decreases to a certain degree in elapsed time even if there are no pinholes and so forth present in the bottle. Therefore, the pressure reduction quantity caused by a temperature decrease or other cause not attributable to pinholes is preliminarily defined in the form of a threshold value $\Delta P_0$, and the amount of a pressure reduction quantity from the time $T=t_1$ to time $T=t_2$ is inspected on the basis of the threshold value $\Delta P_0$. If the pressure reduction quantity does not exceed the threshold value $\Delta P_0$, the bottle is judged to be acceptable. On the other hand, in the case the pressure reduction quantity exceeds the threshold value $\Delta P_0$, the bottle is judged to be unacceptable. For example, since a pressure reduction quantity $\Delta P_1$ of a bottle 1 does not exceed the threshold value $\Delta P_0$, the bottle 1 is judged to be free of defects such as pinholes and be acceptable. On the other hand, since a pressure reduction quantity $\Delta P_2$ of a bottle 2 exceeds the threshold value $\Delta P_0$, the bottle 2 is judged to contain defects such as pinholes and be unacceptable. Air in the bottle is then discharged at the time $T=t_2$, and the pinhole inspection ends after the passage of a predetermined amount of time at a time $T=t_3$. PET bottles that have been judged to be acceptable are transferred to the next step of a sterilization and filling step by a transfer device after the bodies thereof have returned to their original shape. On the other hand, PET bottles that have been judged to be unacceptable are removed and not transferred to the next step.

Bottle inner pressure immediately after air sealing at the time $T=t_1$ of a bottle 3 that contains a pinhole is obviously lower than inner pressure of another acceptable bottle (bottle 1) that is free of pinholes. This tendency becomes increasingly prominent in lightweight, thin-walled bottles in which the wall thickness of the body is thinner than that of conventional bottles.

However, regarding a pressure reduction quantity $\Delta P_3$ of the bottle 3, because of a low inner pressure immediately after air sealing, small quantity of air flows out through a pinhole. As a result, there can be cases in which the pressure reduction quantity $\Delta P_3$ from the time $T=t_1$ to the time $T=t_2$ does not exceed the threshold value $\Delta P_0$. In this case, there is the risk of the bottle 3 being judged to be acceptable according to this conventional inspection method despite the presence of a pinhole therein.

In addition, conventional pinhole inspection apparatuses do not have a function (self-diagnostic function) for confirming the inspection accuracy (pinhole detection accuracy) of the inspection apparatus itself, and the confirmation of the inspection accuracy of the inspection apparatus itself is left to an arbitrary judgment of a user.

In the conventional pinhole apparatus, user judges the inspection apparatus to maintain a required pinhole detection accuracy by periodically placing test pieces containing pseudo pinholes in the inspection apparatus and confirming that these test pieces are reliably rejected by the inspection apparatus. However, not only does this type of confirmation of inspection accuracy require considerable amounts of, time and labor for the task of confirming accuracy, but since the diameter of the pseudo pinholes gradually expand according to the using times of the test pieces, it is necessary to prepare a new test piece with accurate pseudo pinholes for each inspection in order to precisely confirm pinhole detection accuracy, whereby making this method far from rational. In addition, the placement of test pieces was also difficult in the case of production lines in which PET bottles are continuously transferred at high speeds.

In addition, these pinhole inspection apparatuses are provided separately and independently from blow molding machines. Thus, bottles immediately after blow molding are transferred from the exit of the blow molding machine to the entrance of the pinhole inspection apparatus by a conveyor or other type of transfer line. At this time, it is necessary to synchronize the timing at which bottles are fed to the pinhole inspection apparatus and the timing at which the pinhole inspection apparatus takes in the bottles. In the case these times are not in synchronization, the pinhole inspection apparatus ends up operating without containing any bottles, or bottles end up gathering and becoming jumbled at the entrance of the pinhole inspection apparatus, whereby leading to a undesirable situation in terms of production efficiency. In addition, such mechanisms as timing screws and gravity wheels are known to be used as timing adjustment devices for adjusting the timing (see, for example, Patent Document 3).

The timing at which a blow molding machine discharges bottles and the timing at which bottles are taken into the pinhole inspection apparatus are typically not synchronized. Thus, it is necessary to control the feed timing of bottles with a timing screw or other type of timing adjustment device so that the timing at which bottles are fed to the pinhole inspection apparatus is synchronized with the timing at which bottles are taken into the pinhole inspection apparatus.

However, in the case of a timing screw, there is the risk of bottles becoming caught in the threads thereof. In addition, in the case of transferring bottles from a blow molding machine to a pinhole inspection apparatus, there is also the risk of the bottles tumbling and shutting down the line. In conventional blow molding machines and pinhole inspection apparatuses, these problems are unrelated to the shape (cross-sectional shape) or strength (wall thickness), and can occur in bottles of any shape or strength.

Patent Document 1: Japanese Patent Application Laid-open No. 2004-205453
Patent Document 2: Japanese Patent Application Laid-open No. 2002-310843
Patent Document 3: Japanese Patent Application Laid-open No. 2004-26435

DISCLOSURE OF THE INVENTION

Problem to be Solved by the Invention

Therefore, with the foregoing in view, objects of the present invention are to provide a pinhole inspection method for inspecting synthetic resin bottles for pinholes that is able to preferably detect pinholes and improve pinhole inspection accuracy for synthetic resin bottles as compared with conventional pinhole inspections of blow-molded synthetic resin bottles, and to provide a pinhole inspection apparatus incorporating a built-in self-diagnostic function that can suitably confirm pinhole detection accuracy thereof independently of the number of inspections and without placing test pieces containing pseudo pinholes in a transfer line, and to provide a pinhole inspection apparatus capable of safely and reliably inspecting all types of blow-molded bottles for pinholes.

Means for Solving the Problem

In order to achieve the above-mentioned objects, a method for inspecting for a pinhole in a synthetic resin bottle as described in claim 1 is provided with: a step of sealing a gas in a blow-molded synthetic resin bottle; a step of measuring, as a reference inner pressure, inner pressure of the bottle immediately after sealing and checking whether or not the reference inner pressure exceeds a predetermined first threshold value; a step of holding an airtight status of the bottle for a fixed amount of time in a case where the reference inner pressure exceeds the first threshold value; a step of measuring a pressure reduction quantity of the bottle inner pressure from the reference inner pressure after the fixed amount of time has elapsed; and a step of checking whether or not the measured pressure reduction quantity is within a predetermined second threshold value, wherein the bottle is judged to be free of a pinhole and acceptable only in a case where the reference inner pressure exceeds the first threshold value and the pressure reduction quantity does not exceed the second threshold value.

In the method for inspecting for a pinhole in a synthetic resin bottle as described above, the bottle inner pressure immediately after sealing a predetermined amount of gas inside is used as the reference inner pressure, a threshold value (first threshold value) is set for that reference inner pressure, bottles that do not exceed that first threshold value are screened out as being unacceptable, and all remaining pressure holding and other steps are not carried out. On the other hand, bottles that have exceeded the first threshold value are sequentially subjected to the following steps of pressure holding and measurement of pressure reduction quantity, and in the case the pressure reduction quantity does not exceed the second threshold value, that bottle is finally judged to be acceptable. In this manner, by providing a threshold value for the reference inner pressure during measurement of the pressure reduction quantity as well, unacceptable bottles containing a pinhole can be reliably screened out.

A pinhole inspection apparatus for achieving the above-mentioned object as described in claim 2 is a pinhole inspection apparatus which supplies a predetermined amount of gas into a bottle, sealing the mouth of the bottle, measuring a reduction in inner pressure of the bottle or an amount of elongation in an axial direction of the bottle after a fixed amount of time has elapsed, and judging the presence of a pinhole in the bottle on the basis of a result of the measuring, wherein a branch line is provided at an intermediate location of a gas supply line or pressure detection line of the bottle, and an orifice serving as a pseudo pinhole is connected to the branch line via a valve.

In the pinhole inspection apparatus described above, a state in which a gas is sealed in a bottle is formed by introducing a predetermined amount of gas into a gas circuit containing a normal bottle (free of a pinhole) and closing a gas supply valve. Moreover, a branch is present at an intermediate location of a gas supply line upstream from the bottle or a pressure detection line that detects a bottle inner pressure, and an orifice serving as a pseudo pinhole is provided in that branch line via a valve (self-diagnostic valve). Consequently, the state of a pseudo leak, as if a pinhole is present in a bottle and gas is leaking through the pinhole, can be formed by opening the valve (self-diagnostic valve) of the branch line. In other words, in the above-mentioned pinhole inspection apparatus, the detection accuracy of the pinhole inspection apparatus can be confirmed by connecting a test piece in the form of an orifice to a circuit in which gas has been sealed in a normal bottle (free of a pinhole) and making it appear as if a pinhole in the normal bottle. As a result, it is no longer necessary to go to the trouble of placing a test piece containing a pseudo pinhole in a transfer line in place of normal bottles, and as a result, both labor and time involved in producing the test piece and placing the test piece in the pinhole inspection apparatus can be completely eliminated. In addition, since a metal part in the form of an orifice is used, the problem of expansion in hole diameter proportional to the number of inspections no longer occurs.

In a pinhole inspection apparatus described in claim 3, the orifice has a variable hole diameter.

Since the above-mentioned pinhole inspection apparatus is configured so as to allow the hole diameter of the orifice to be varied according to the purpose of the inspection and the like, various types of pinholes corresponding to expected various cases can be simulated (mimicked).

In a pinhole inspection apparatus described in claim 4, a member of the orifice that forms a portion of a flow path of the branch line is provided replaceable in the branch line.

In the above-mentioned pinhole inspection apparatus, various types of pinholes corresponding to expected various cases can be easily simulated by replacing the member serving as a portion of the flow path with another member having a different hole diameter.

In a pinhole inspection apparatus described in claim 5, a predetermined amount of gas is supplied into the bottle, the mouth of the bottle is sealed, and an inner pressure of the bottle is measured, as a reference inner pressure, immediately after sealing the gas, a pressure reduction quantity of the inner pressure from the reference inner pressure is measured after a fixed amount of time has elapsed, and the bottle is judged to be free of a pinhole and acceptable only in a case where the reference inner pressure exceeds a predetermined first threshold value and the pressure reduction quantity does not exceed a predetermined second threshold value.

In the above-mentioned pinhole inspection apparatus, the bottle is judged to be free of a pinhole and acceptable only in the case of having measured, as a reference inner pressure, the inner pressure of the bottle immediately after having sealed a predetermined amount of gas therein, judging whether the reference inner pressure exceeds a predetermined first threshold value, and judging whether the pressure reduction quantity exceeds a predetermined second threshold value by measuring the pressure reduction quantity in the following step of pressure holding. In this manner, by setting a threshold value for measurement of pressure reduction quantity and providing a threshold value for the reference inner pressure of bottle inner pressure immediately after gas sealing as well, unacceptable bottles containing a pinhole can be reliably screened out.

In a pinhole inspection apparatus described in claim 6, the pinhole inspection apparatus detects a bottle for the presence of a pinhole by supplying a predetermined amount of gas into the bottle, sealing the bottle mouth, and then measuring the amount of elongation of the bottle in the axial direction of the bottle after a fixed amount of time has elapsed.

For example, in the case of sealing a predetermined amount of gas in a light bottle with thin wall and holding for a fixed amount of time, if a pinhole is not present in the bottle, the bottle undergoes elastic deformation in the axial direction proportional to the increase in bottle inner pressure. On the other hand, if a pinhole is present in the bottle, since gas leaks through the pinhole, the bottle does not deform in the axial direction. Even if it does deform, the amount of that elastic deformation is extremely small.

Thus, in the above-mentioned pinhole inspection apparatus, by sealing the predetermined amount of gas in the bottle and measuring the amount of elastic deformation in the axial direction of the bottle in the case of holding for a fixed amount of time, the presence of a pinhole can be detected as preferably as the manner by measuring the pressure reduction quantity as previously described.

In a pinhole inspection apparatus described in claim 7, the pinhole inspection apparatus measures the amount of elongation in the axial direction of the bottle while inhibiting elongation in the radial direction perpendicular to the axial direction of the bottle.

Since lightweight bottles easily deform vertically and horizontally when a gas is supplied to the bottle, such cases can occur in which the bottles do not show such an amount of deformation in a desired direction prominently with respect to the amount of supplied gas. This tendency is observed in lightweight bottles, and particularly in lightweight bottles having an oblong shape or oval shape.

Therefore, in the above-mentioned pinhole inspection apparatus, the amount of elongation in the axial direction of a bottle is measured while inhibiting elongation in the radial direction so that the amount of elongation in the axial direction is expressed prominently with respect to the amount of supplied gas. As a result, a deformation in the radial direction is transformed to that in the axial direction and, the deformation in the axial direction increases, whereby facilitating detection of the presence of a pinhole.

In addition, in the case of inspecting the inside of a bottle that is in positive pressure, the deformation of the bottle can be inhibited and the pressurization in the bottle can be accelerated by restricting elongation in a direction in which the bottle elongates easily (radial direction).

In a pinhole inspection apparatus described in claim 8, the pinhole inspection apparatus is so configured as to be integrated with a blow molding machine that manufactures bottles from performs by biaxial stretch blowing method.

Since the above-mentioned pinhole inspection apparatus is provided by being preliminarily integrated with a blow molding machine, not requiring such a transfer line that connects the blow molding machine and the pinhole inspection apparatus as well as a timing adjustment device and the like, or the transfer line can be considerably simplified. As a result, bottles rarely become caught in the threads of a timing screw or bottles rarely tipping over on the transfer line. As a result, all types of blow-molded bottles can be safely and reliably inspected for a pinhole regardless of the shape or strength of the bottle. Moreover, by integrating the pinhole inspection apparatus with a blow molding machine, the space occupied by the entire production line, including sterilization and filling systems, can be reduced and the compact of equipment can be realized. Furthermore, the pinhole inspection apparatus can be integrated internally with the blow molding machine, or can be installed (added) externally such as by integrating with the blow molding machine in close proximity to the exit thereof.

In a pinhole inspection apparatus described in claim 9, the pinhole inspection apparatus and the blow molding machine are so integrated as to be connected by a plurality of rotating wheels driven by same drive mechanism.

In the above-mentioned pinhole inspection apparatus, the pinhole inspection apparatus shares the drive mechanism with the blow molding machine and synchronized therewith, and are integrally provided so that the bottles can be transferred between them without going through a transfer conveyor or timing adjustment device and the like. In other words, since the above-mentioned plurality of rotating wheels are driven by the same drive mechanisms, the rotating wheels are synchronized at all times, and bottles are transferred between these rotating wheels. As a result, blow-molded bottles are sequentially transferred between these synchronized rotating wheels, whereby making it possible to transfer the bottles to the next step of the pinhole inspection without going through a conveyor or timing adjustment device. As a result, line problems such as bottles becoming caught in the threads of a timing screw or bottles tipping over on the transfer line no longer occurring, all types of blow-molded bottles can safely and reliably undergo pinhole inspection regardless of the shape or strength of the bottles. Moreover, by integrating the pinhole inspection apparatus with the blow molding machine, the space occupied by the entire production line, including sterilization and filling systems, can be reduced and the compact of the equipment can be realized. Furthermore, the pinhole inspection apparatus can be integrated internally with the blow molding machine, or can be installed (added) externally such as by integrating with the blow molding machine in close proximity to the exit thereof.

Effects of the Invention

According to the method for inspecting synthetic resin bottles for pinholes of the present invention, with the inner pressure of the bottle immediately after sealing a predetermined amount of gas inside being taken as "the reference inner pressure for measurement of a pressure reduction quantity", a threshold value is set for that reference inner pressure, pressure holding and measurement of the pressure reduction quantity are carried out on those bottles that clear that threshold value, and in the case the quantity of the pressure reduction from the reference inner pressure does not exceed a threshold value, those bottles are judged to be acceptable.

In the conventional inspection methods, bottles containing pinholes have the risk of being judged acceptable due to the bottle inner pressure inherently being low immediately after gas sealing due to the presence of pinholes, which prevents a pressure reduction quantity from being significantly different from the pressure reduction quantity of acceptable bottles. However, in the inspection method of the present invention, bottles containing pinholes can be reliably screened out.

In addition, according to the pinhole inspection apparatus of the present invention, the pinhole detection accuracy of the inspection apparatus itself can be suitably confirmed without placing a test piece containing pseudo pinholes in the transfer line in place of normal bottles (free of pinholes). As a result, both labor and time involved in placing the test piece in the pinhole inspection apparatus, including test piece production, can be completely eliminated. In addition, pseudo leaks are formed in the bottle by an orifice of a self-diagnostic valve provided on the gas supply line or pressure detection line of the bottle, whereby confirmation of pinhole detection accuracy no longer comes to be dependent on the number of inspections. In addition, pseudo leaks can easily be formed in the bottle by the orifice of the self-diagnostic valve, such troubles concerning a bottle rejection mechanism can be easily discovered as in the case bottles not being rejected when the self-diagnostic valve is open. In this manner, the inspection accuracy of the inspection apparatus itself (absence of deterioration of the inspection function thereof) can be suitably confirmed, whereby improving the quality of pinhole inspections. By the way, since pseudo pinholes are reliably provided in the inspection circuit, bottles that are fed to the inspection apparatus during opening of the self-diagnostic valve are to be all rejected by the inspection apparatus as being unacceptable regardless of the presence or absence of pinholes in the bottles. In this case, the bottle rejection mechanism is thought to have a malfunction if the bottles are not all rejected. Therefore, the pinhole inspection apparatus of the present invention makes it easy to discover such problems concerning the bottle rejection mechanism as the problem that bottles are not rejected although judged to be unacceptable by the inspection apparatus.

In addition, in the case the pinhole inspection apparatus of the present invention and a blow molding machine are integrated such that the drive mechanisms of the pinhole inspection apparatus and the blow molding machine are the same and synchronized, and the bottles can be transferred between the pinhole inspection apparatus and the blow molding machine without going through a transfer line conveyor or timing adjustment device and the like, such a line problems as bottles becoming caught in the threads of a timing screw or bottles tipping over on the transfer line no longer occur. As a result, all types of blow-molded bottles can be safely and reliably inspected for pinholes regardless of the shape or strength thereof. Moreover, by integrating the pinhole inspection apparatus with a blow molding machine, the space occupied by the entire production line, including sterilization and filling systems, can be reduced and equipment can be made more compact. Furthermore, the pinhole inspection apparatus can be integrated internally with the blow molding machine therein, or can be installed (added) externally such as integrated with the blow molding machine in close proximity to the exit thereof.

DESCRIPTION OF REFERENCE NUMERALS

Figure 1:
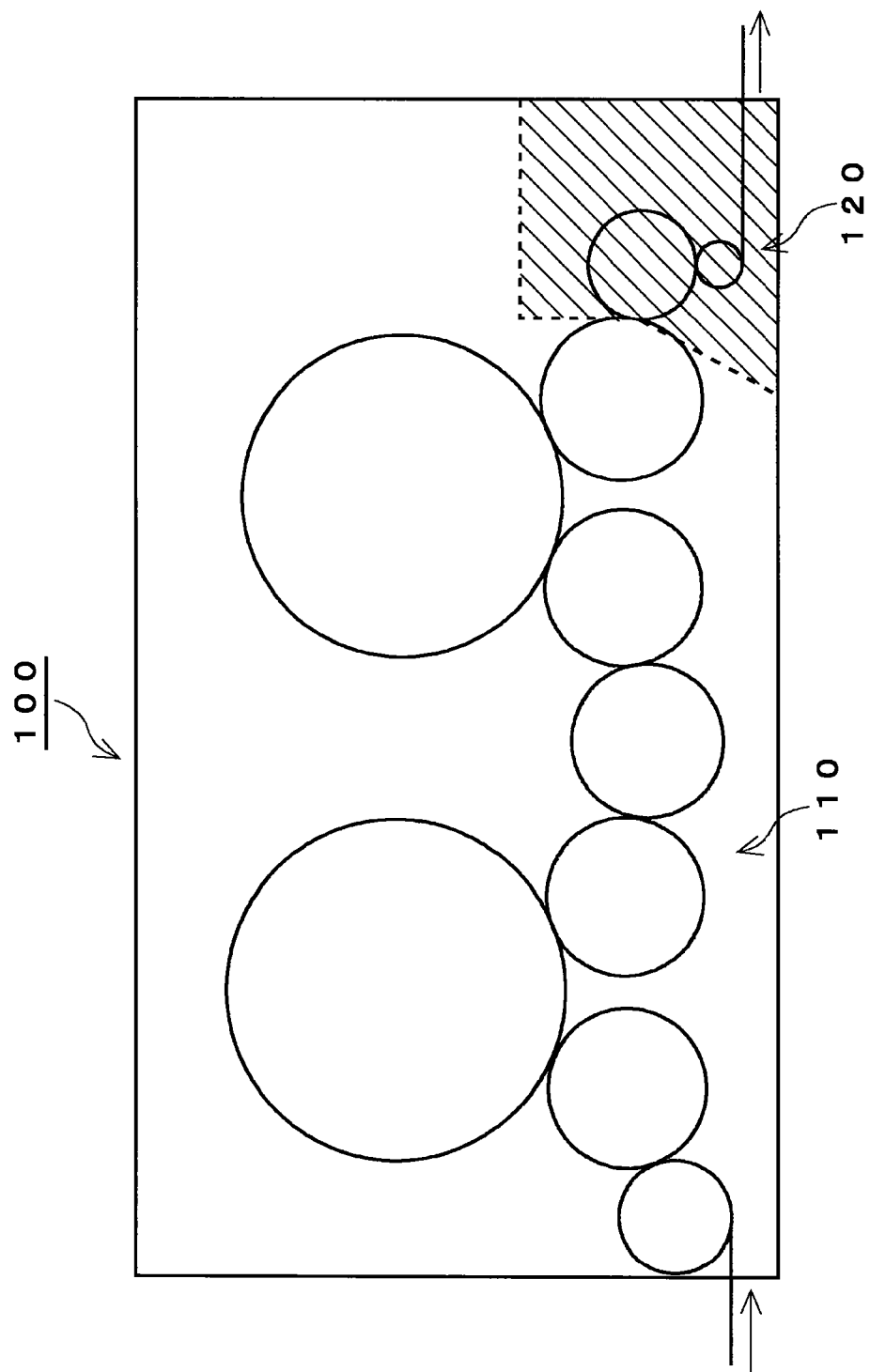
FIG. 1 is an explanatory drawing showing a blow molding machine with a pinhole inspection unit in accordance with the present invention.

1 Bottle
2 Gripper
3 Supply valve
4 Self-diagnostic valve
5 Pressure detection unit
6 Air source
7 Air supply line 8 Pressure detection line
9 Controller
10 Air injector
11 Pressure head
12 Body
13 Supply port
14 Pressure port
15 Spring mechanism
100,200 Blow molding machine with pinhole inspection function
110 Blow molding unit
120 Pinhole inspection unit

BEST MODE FOR CARRYING OUT THE INVENTION

The following provides a more detailed explanation of the present invention through the embodiments showed in the drawings.

FIG. 1 is an explanatory block diagram showing a blow molding machine 100 equipped with a pinhole inspection function that applies the pinhole inspection apparatus of the present invention.

This blow molding machine 100 equipped with a pinhole inspection function is composed of a blow molding unit 110, which produces an intermediate product in the form of a bottle by placing a preform in a metal mold, heating the preform to a temperature that allows stretch and orientation of the preform with a heating means such as a heater, inserting a stretching rod into the preform that injects high-pressure air, and stretching the preform biaxially with the stretching rod and the high-pressure air; and a pinhole inspection unit 120, which fills and seals air in a bottle, holds the state in which air is sealed within the bottle for a fixed amount of time, and judges the presence of a pinhole in the bottle on the basis of a bottle inner pressure immediately after filling with air (reference inner pressure) and a pressure reduction quantity of the bottle inner pressure after that fixed amount of time has elapsed. Furthermore, the details of the pinhole inspection unit 120 are hereinafter described with reference to FIGS. 2 and 3.

In prior arts, intermediate products in the form of bottles immediately after blow-molded are transferred to a pinhole inspection apparatus by a conveyor or other transfer line in order to receive pinhole inspections. Consequently, a timing adjustment device such as a timing screw are provided in the transfer line so as to coordinate the timing at which the transfer line transports bottles to the entrance of the pinhole inspection apparatus having an independent drive mechanism, and the timing at which the pinhole inspection apparatus takes in the bottles. On the other hand, line problems due to the timing adjustment device occurred such as the transferred bottles becoming caught in the threads of the timing screw or bottles tipping over on the transfer line. Therefore, in the blow molding machine 100 equipped with a pinhole inspection function of the present invention, since an inspection device that inspects for pinholes in the bottles (pinhole inspection unit 120) is connected to and integrated with a blow molding machine (blow molding unit 110) by a plurality of rotating wheels that are driven by the common drive mechanism, a timing screw or other timing adjustment device as well as a transfer line are not required. Thus, conventional problems such as bottles becoming caught in the timing screw or bottles tipping over on the transfer line no longer occur. As a result, all types of blow-molded bottles can be safely and reliably inspected for pinholes regardless of the shape or strength of the bottles. Moreover, integrating the pinhole inspection unit 120 with the blow molding unit 110 makes it possible to reduce the space occupied by the entire production line, including sterilization and filling systems, as well as the compact of equipment. Furthermore, the pinhole inspection apparatus can be integrated internally with the blow molding machine, or can be installed (added) externally as in close proximity to the exit of the blow molding machine, as described later in Practical Example 1.

Figure 2:
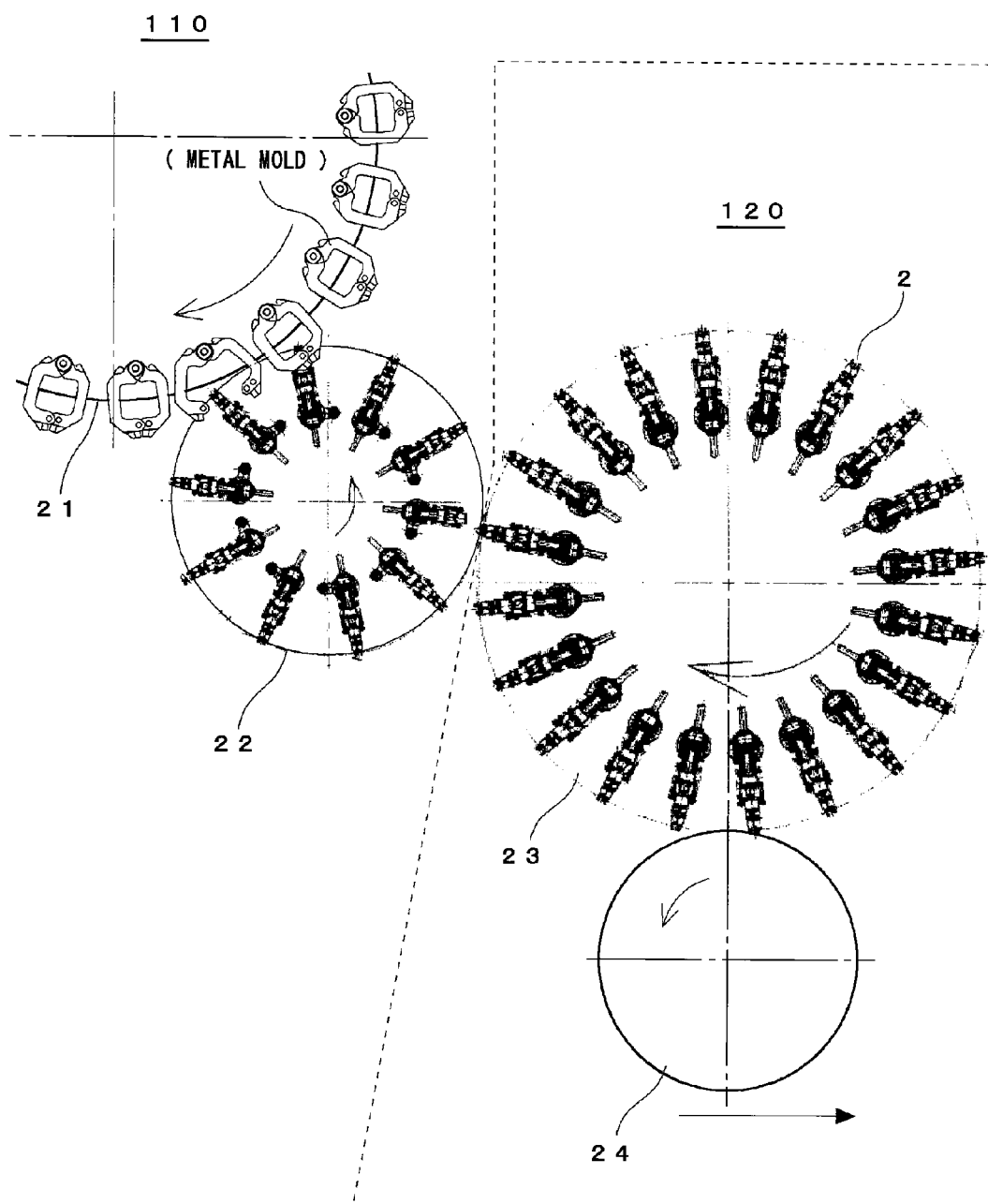
FIG. 2 is an explanatory drawing showing a pinhole inspection unit in accordance with the present invention.

FIG. 2 is an explanatory drawing showing the blow molding unit 110 and the pinhole inspection unit 120 in accordance with the present invention.

In the blow molding unit 110, preforms are heated to a temperature so that allows stretch and orientation thereof, and are supplied to a plurality (for example, 20) of metal molds arranged at equal intervals on a continuously rotating blow wheel 21 via a preform transfer wheel (not shown), and bottles are sequentially molded within the metal molds by stretching rods and blowing air. The molded bottles are removed from the metal molds by grippers of a bottle removal wheel 22 and transferred to the next step containing the pinhole inspection unit 120.

In the pinhole inspection unit 120, a pinhole inspection wheel 23 first receives bottles from the grippers of the bottle removal wheel 22 by a plurality of grippers 2 similarly arranged at equal intervals around the outer periphery thereof, supplying a predetermined amount of measurement air to the bottles by air injectors (not shown) that form a pair with the grippers 2, and performing pinhole inspections on those bottles thereon. Furthermore, the specific method by which pinholes are detected will be described later. Bottles are transferred to an exit side transfer wheel 24 after pinhole inspection. Thus, these rotating wheels 21, 22, 23 and 24 completely synchronized to transfer bottles. Regarding the means of holding the bottles in this pinhole inspection apparatus, in addition to holding the necks of the bottles by the grippers 2 as shown in the drawings, a pocket holding may be used in which neck rings on the bottle necks are engaged with and placed in pockets formed on the ends of rotating wheels.

Figure 3:
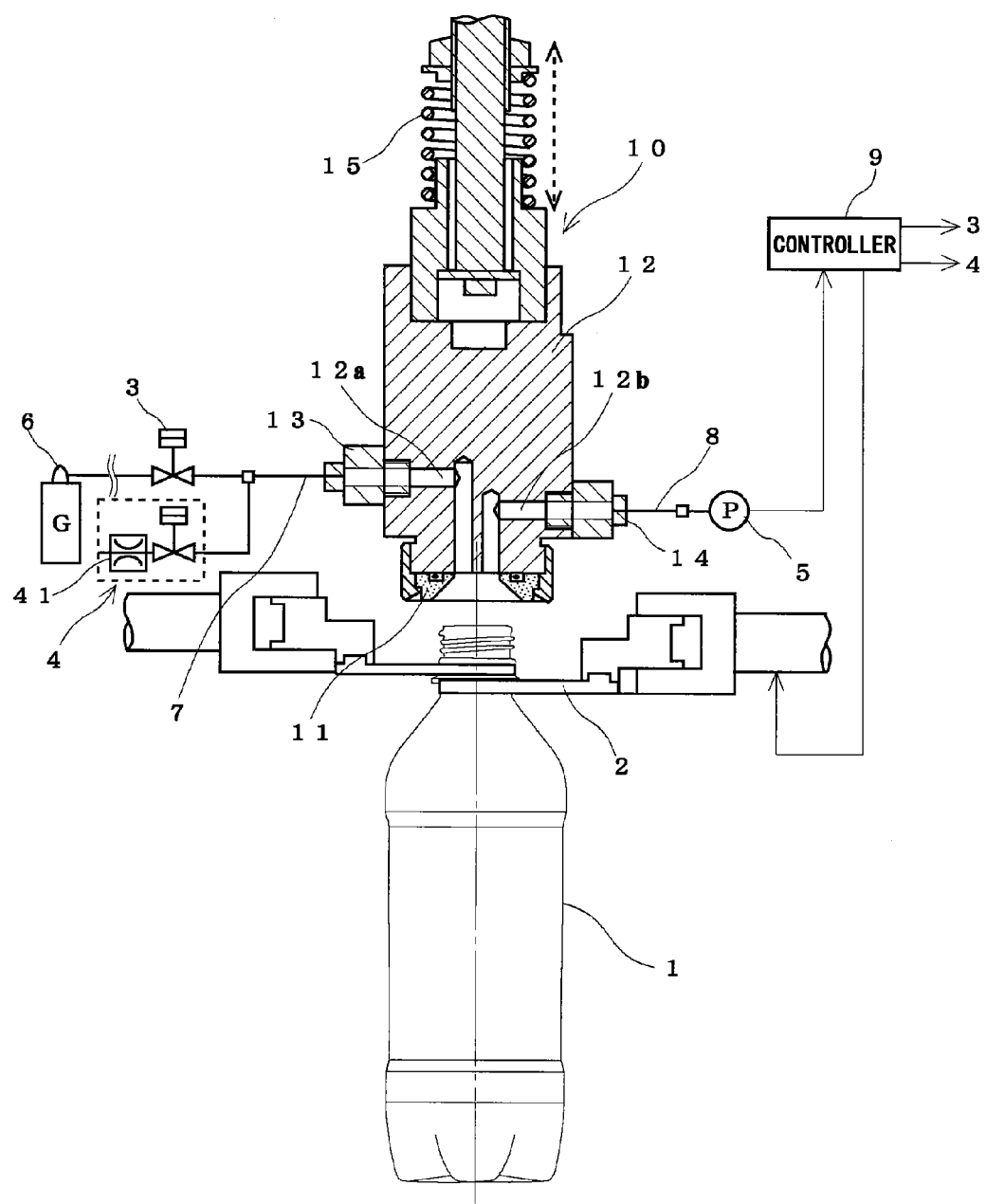
FIG. 3 is an explanatory drawing showing the essential portions of a pinhole inspection apparatus of a pinhole inspection unit.

FIG. 3 is an explanatory drawing showing the essential portions of a pinhole inspection apparatus of the pinhole inspection unit 120. Furthermore, although only one pair of the grippers 2 and air injectors 10 is depicted in the drawing, a plurality of pairs of the grippers 2 and the air injectors 10 are actually arranged at equal intervals on the pinhole inspection wheel.

This pinhole inspection apparatus is composed by being provided with an air injector 10 that supplies air to a bottle 1 and outputs (feeds back) a bottle inner pressure, a gripper 2 that stabilizes the position of the bottle 1 while holding the neck of the bottle 1, a supply valve 3 that intermittently supplies air to the air injector 10, a self-diagnostic valve 4 that forms a pseudo leak of the bottle 1, a pressure detection unit 5 that measures a pressure reduction quantity in the bottle 1 from the reference inner pressure after a fixed amount of time has elapsed, an air source 6 that stably supplies air regulated to a constant pressure, an air supply line 7 that transfers air, a pressure detection line 8 that transmits pressure, and a controller 9 that opens and closes the supply valve 3 and the self-diagnostic valve 4, and that judges the bottle 1 to be unacceptable and sends a command to reject the bottle from the line in the case the pressure reduction quantity has exceeded a threshold value on the basis of a signal from the pressure detection unit 5. Furthermore, details of the self-diagnostic valve 4 and the pressure detection unit 5 are described later with reference to FIGS. 4 to 8. It is noted that "the reference inner pressure of the bottle 1" refers to the inner pressure of the bottle 1 immediately after closing the supply valve 3.

The bottle 1 is a synthetic resin bottle such as a PET bottle, blow-molded from a preform, and is transferred to the entrance (interface) of the pinhole inspection wheel 23 via the bottle removal wheel 22, where it transferred directly beneath the air injector 10 in the upright position while being held by the neck thereof by the gripper 2.

The supply valve 3 and the self-diagnostic valve 4 are preferable solenoid valves from the viewpoint of response. In addition, the supply valve 3 and the self-diagnostic valve 4 are so-called normally closed valves that are controlled by the controller 9 so that they are only opened for a predetermined time of ON time while being held closed at all other times.

The self-diagnostic valve 4 is provided with an orifice 41 in the outlet portion thereof. This orifice 41 simulates a pinhole in the bottle 1. Although the details thereof will be described later with reference to FIGS. 4 to 8, when the self-diagnostic valve 4 is open, air filled in the bottle 1 flows out from the orifice 41 as if a pinhole were present in the bottle 1, whereby forming a pseudo leak as if air were actually leaking from the bottle. At this time, the controller 9 judges that air is leaking from a pinhole of the bottle 1 on the basis of the pressure reduction quantity of the bottle 1 and rejects the bottle 1 by driving the gripper 2. In this manner, so-called self-diagnosis can be carried out in which the inspection accuracy of the pinhole detection apparatus itself (for the inspection function thereof not to be deteriorated) is confirmed by opening the self-diagnostic valve 4. In addition, the orifice 41 is installed so replaceable as to be able to accurately simulate pinholes of various types of bottles in expected various cases.

The orifice 41 is provided with, for example, a choke mechanism, and may be in the form of a variable orifice in which the hole diameter changes continuously and linearly. Alternatively, a plurality of interchangeable members may be provided in the branch line and the hole diameter may be changed for each member. Moreover, the means for varying the hole diameter of the orifice is not limited thereto, but rather any known means can be suitably used.

The pressure detection unit 5 is provided with both a pressure sensor that measures an inner pressure of the bottle 1 and a differential pressure sensor that measures a pressure reduction quantity from the reference inner pressure after a fixed amount of time has elapsed.

The air source 6 stably supplies air regulated to a constant pressure within the range of, for example, 20 to 25 kPa with a pressure control valve or pressure reducing valve.

The air supply line 7 originates from the supply valve 3, branched in two directions by means of a joint located at an intermediate location thereof, and one end is connected to a supply port 13 while the other end is connected to the self-diagnostic valve 4.

The pressure detection line 8 connects a pressure port 14 and the pressure detection unit 5. In addition, the pressure detection line 8 has a joint that connects the branch line at an intermediate location thereof. Thus, the self-diagnostic valve 4 can be connected to this joint in the same manner as the joint provided in the air supply line 7 in order to enable confirmation of the inspection accuracy (for inspection function not to be deteriorated) of the system prior to pinhole inspection.

The controller 9 controls both of the supply valve 3 and the self-diagnostic valve 4 in opening and closing. This controller also judges the bottle 1 to have a pinhole and rejects the bottle 1 by driving the gripper 2 in the case the pressure reduction quantity from the reference inner pressure after a fixed amount of elapsed time exceeds a preset threshold value on the basis of an output signal from the pressure detection unit 5. In addition, the controller 9 controls each of the timing of the wheels 21, 22, 23 and 24 shown in FIG. 2 so that bottles are suitably transferred.

The air injector 10 is composed of a pressure head 11 that makes airtight contact with the bottle mouth, a body 12 in which is formed therein 2 channels of flow paths consisting of a supply flow path 12*a* and a pressure detection flow path 12*b*, a pressure port 13 serving as an air introduction port, a pressure port 14 that outputs the inner pressure of the bottle 1, and a spring mechanism 15 that absorbs impacts when the pressure head 11 contacts the bottle mouth.

The air injector 10 is able to move up and down by a lifting and lowering device (not shown). Thus, this lifting and lowering device lowers the pressure head 11 to allow contact with the bottle mouth when supplying air to the bottle 1, whereas it raises the pressure head 11 to allow it to move away from the bottle mouth when air is evacuated from the bottle 1 (when braking the air sealed state). In addition, the pressure head 11 may be composed of synthetic rubber or other elastic material in order to ensure sealing with the bottle mouth. In addition, the air injector 10 may be provided with an alignment adjustment mechanism that corrects a positional offset between the axial center of the pressure head 11 and the axial center of the bottle 1 in coordination with or instead of the spring mechanism 15.

Figure 4:
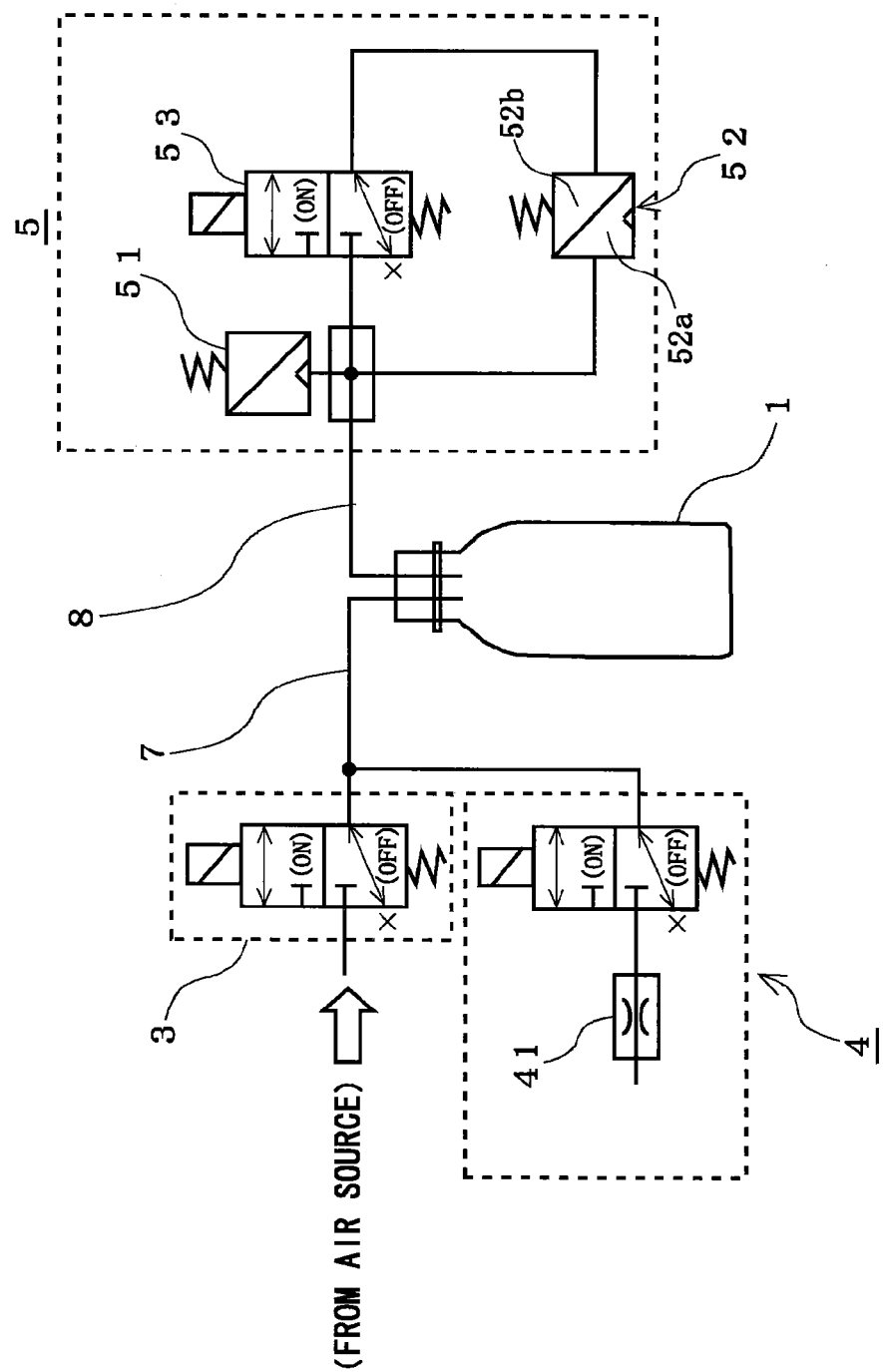
FIG. 4 is an explanatory drawing showing the essential portions of a self-diagnostic valve and a pressure detection unit in accordance with the present invention.

FIG. 4 is an explanatory drawing showing the essential portions of the self-diagnostic valve 4 and the pressure detection unit 5.

The self-diagnostic valve 4 is provided with the orifice 41 at the outlet thereof. This self-diagnostic valve 4 is normally closed and maintains sealing of the bottle 1 together with the supply valve 3. In addition, the orifice 41 is composed to be so removable as to be replaced with orifices having different hole diameters, whereby making it possible to accurately simulate pseudo pinholes of various bottles. Thus, when the self-diagnostic valve 4 is opened, air flows from the bottle 1 out through the orifice 41 and as a result, a pseudo leak is formed as if air was actually leaking from a pinhole. Thus, if the pinhole inspection apparatus itself operates normally, it judges that there is a pinhole in the bottle 1 on the basis of the pressure reduction quantity due to the outflow of air, and as a result, the bottle 1 is rejected.

In this manner, the self-diagnostic valve 4 not only allows it unnecessary to place a test piece with a pseudo pinhole in the transfer line in place of the bottle 1, but also makes it possible to carry out self-diagnosis by forming pseudo leaks that accurately simulate various pinholes in various bottles. As a result, the inspection accuracy (for inspection function not to be deteriorated) of the pinhole inspection unit 120 can be suitably confirmed, whereby improving the quality of pinhole inspections.

The pressure detection unit 5 is composed of a pressure sensor 51 that constantly measures inner pressure of the bottle 1, a differential pressure sensor 52 that measures a pressure reduction quantity from the reference inner pressure of the bottle 1 after a fixed amount of time has elapsed, and a differential pressure valve 53 that switches two chambers of the differential pressure sensor 52 so as to make a communicating state or a non-communicating state. In addition, as described later, the opening and closing operations of the differential pressure valve 53 are synchronized with the opening and closing operations of the supply valve 3, such that the differential pressure valve 53 is simultaneously opened (ON) when the supply valve 3 is opened (ON), and the differential pressure valve 53 is simultaneously closed (OFF) when the supply valve 3 is closed (OFF).

The differential pressure sensor 52 has two chambers consisting of a first chamber 52a that communicates with the bottle 1 at all times, and a second chamber 52b that communicates with the bottle 1 only when the differential pressure valve 53 is ON. Thus, the pressure of the first chamber 52a is used to monitor the inner pressure of the bottle 1 at all times. On the other hand, since the bottle 1 and the second chamber 52b are not in communication when the differential pressure valve 53 is OFF (when the supply valve 3 is OFF), pressure of the second chamber 52b while the time the differential pressure valve 53 is OFF indicates the inner pressure of the bottle 1 immediately after the supply valve 3 was switched OFF. Thus, the pressure of the second chamber 52b serves as a reference inner pressure when measuring a pressure reduction quantity of the bottle 1 after a fixed amount of time has elapsed. Thus, the differential pressure sensor 52 monitors the following: Pressure reduction quantity of the bottle 1=(the inner pressure of the bottle 1 immediately after the supply valve 3 is switched OFF)−(the inner pressure of the bottle 1 at that time).

FIGS. 5 to 8 are explanatory drawings showing the operation of the self-diagnostic valve 4 and the pressure detection unit 5.

Figure 5:
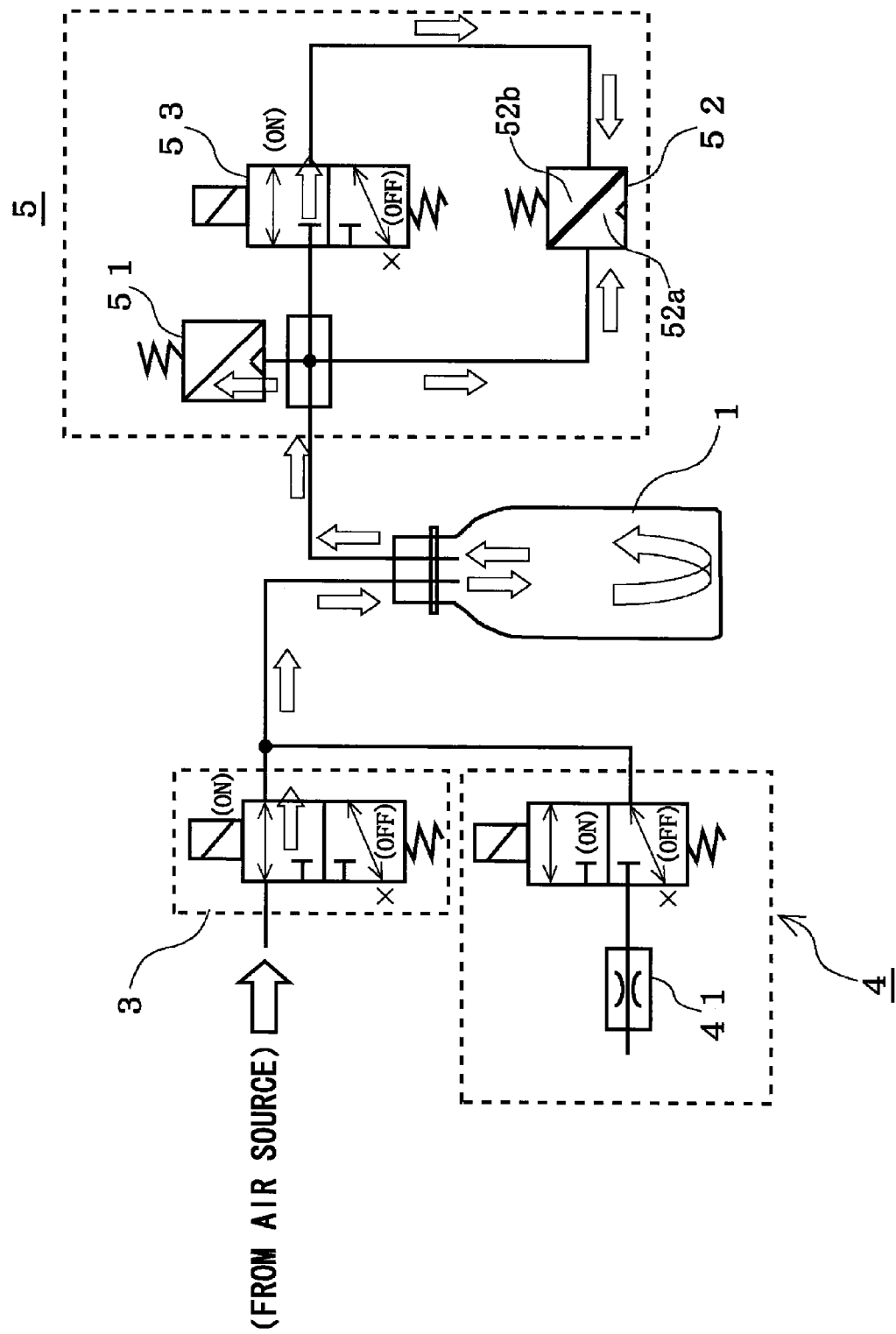
FIG. 5 is an explanatory drawing showing the operation of a self-diagnostic valve and a pressure detection unit immediately after opening of a supply valve in accordance with the present invention.

First, as shown in FIG. 5, when the controller 9 opens the supply valve 3 (switches the supply valve 3 ON), the differential pressure valve 53 is also simultaneously switched (ON), and air is supplied to the bottle 1, the first chamber 52a and the second chamber 52b of the differential pressure sensor 52. Furthermore, at this time, those deformable portions of a bottle such as the body are slightly deformed in the manner of expansion to the outside due to the increasing of the inner pressure therein. The inside of the bottle immediately after introducing air is in a transient state in which air molecules are violently colliding, whereby causing the temperature of the air to rise. However, the inside of the bottle approaches a steady state and the body of the bottle that expanded to the outside returns to the normal state over time, whereby causing the inner pressure of the bottle 1 to gradually decrease and converge on a constant pressure. In addition, the self-diagnostic valve 4 is closed (OFF) at this time.

Figure 6:
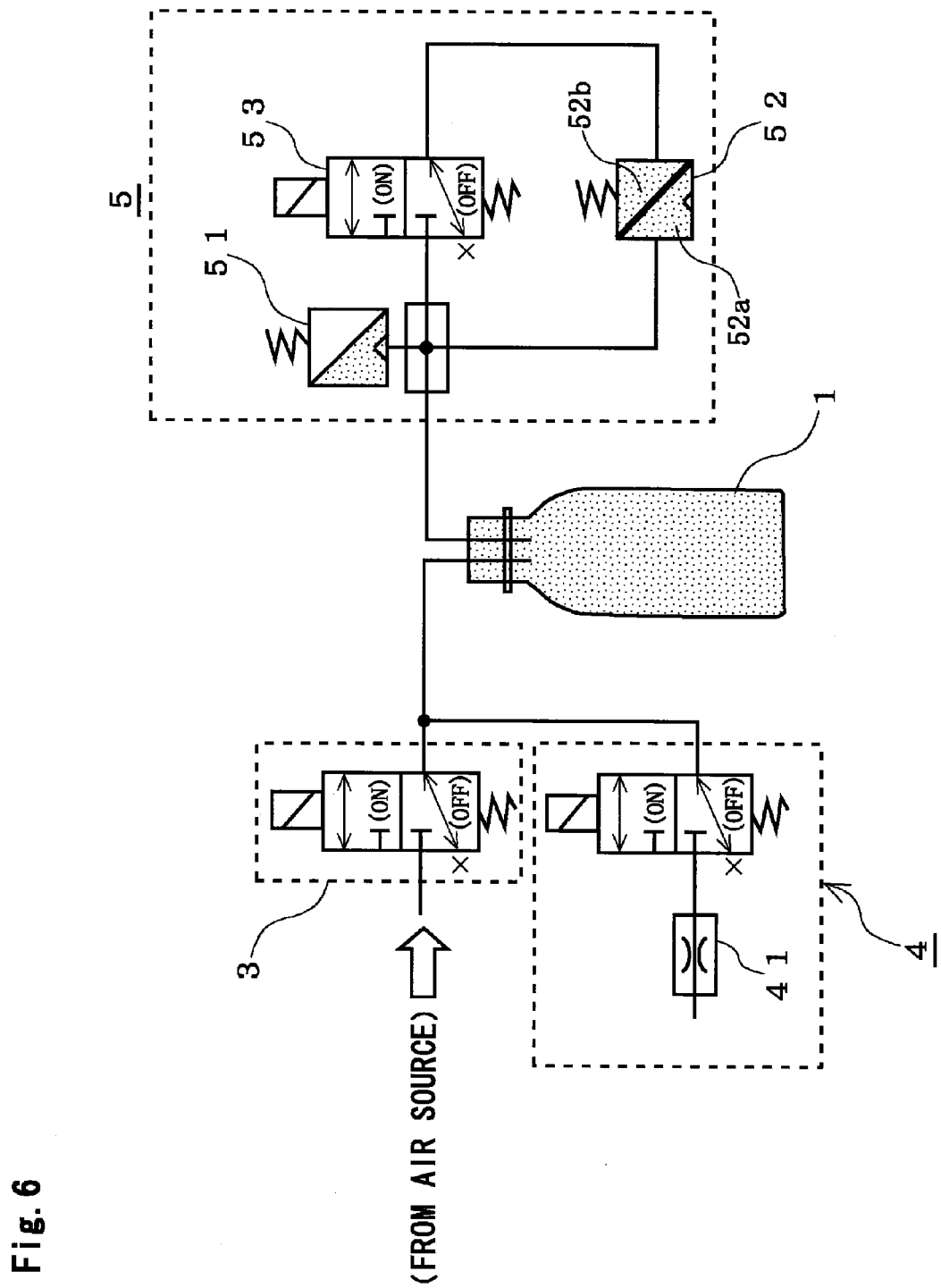
FIG. 6 is an explanatory drawing showing the operation of a self-diagnostic valve and a pressure detection unit immediately after closing of a supply valve in accordance with the present invention.

As shown in FIG. 6, in a given ON time of the supply valve 3, that is, after the amount of air is supplied, the controller 9 switches the supply valve 3 and the differential pressure valve 53 to be OFF. As a result, the first chamber 52a and the second chamber 52b are in a non-communicating state. The indication value of the pressure sensor 51 at this time is the reference inner pressure relating to the measurement of the pressure reduction quantity, and is used in a step of judging for the presence of a pinhole by inspecting whether or not this reference inner pressure exceeds a predetermined threshold value. In addition, the pressure of the first chamber 52a and the pressure of the second chamber 52b are mutually equal at this time, and as a result thereof, the differential pressure sensor 52 indicates a value of zero. It is noted that the self-diagnostic valve 4 is closed (OFF) at this time.

Figure 7:
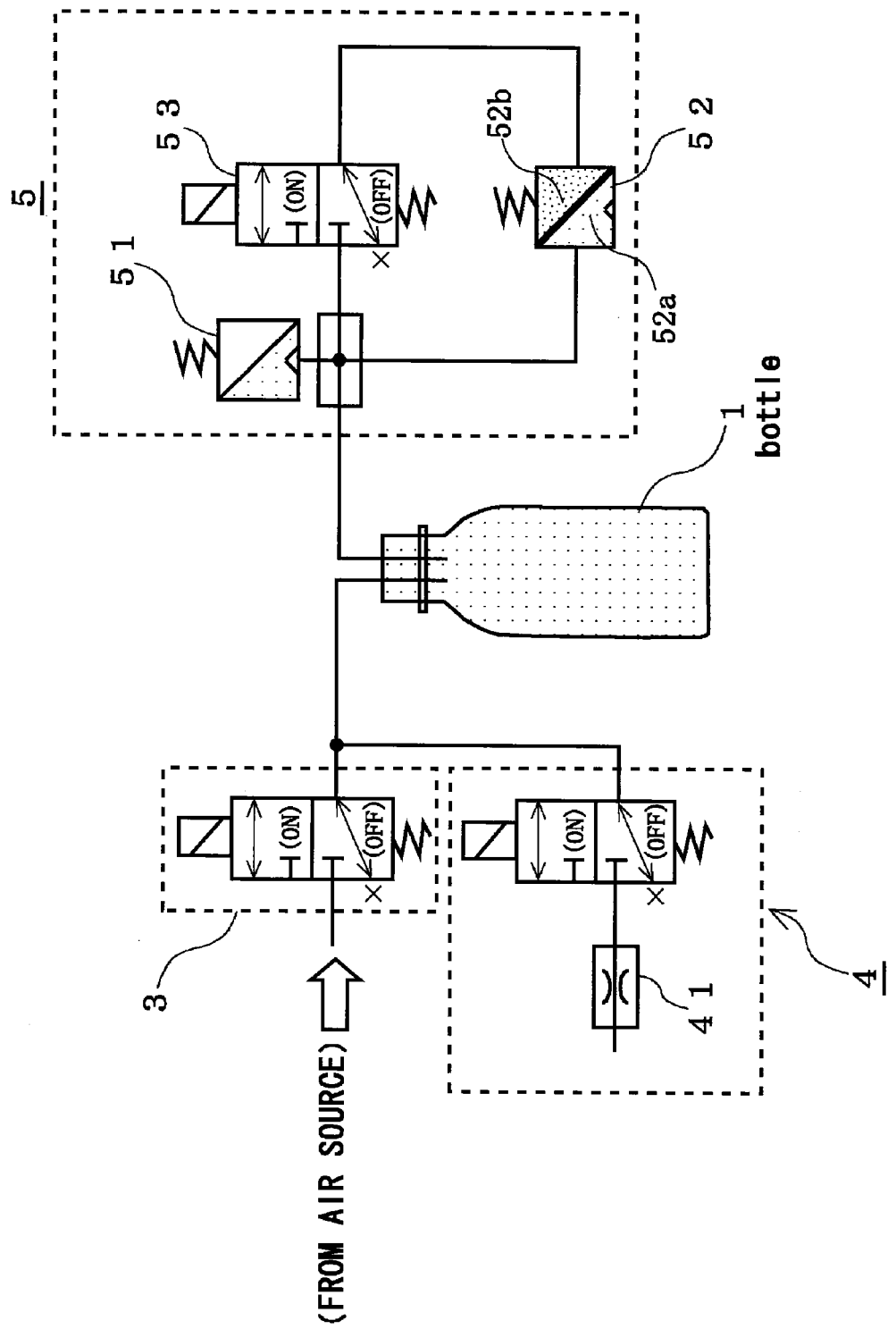
FIG. 7 is an explanatory drawing showing the operation of a self-diagnostic valve and a pressure detection unit in an elapsed time after closing of a supply valve in accordance with the present invention.

As shown in FIG. 7, the inside of the bottle 1 reaches a steady state after the passage of a fixed amount of time. Unless there is a defect such as a pinhole in the bottle 1 that breaks the air tight thereof, nothing occurs except for only a slight pressure decrease due to a temperature decrease and an expansion of the bottle body. Thus, a slight pressure difference occurs between the first chamber 52a and the second chamber 52b of the differential pressure sensor 52 corresponding to the slight pressure decreases. It is noted that the self-diagnostic valve 4 is closed (OFF) at this time.

Figure 8:
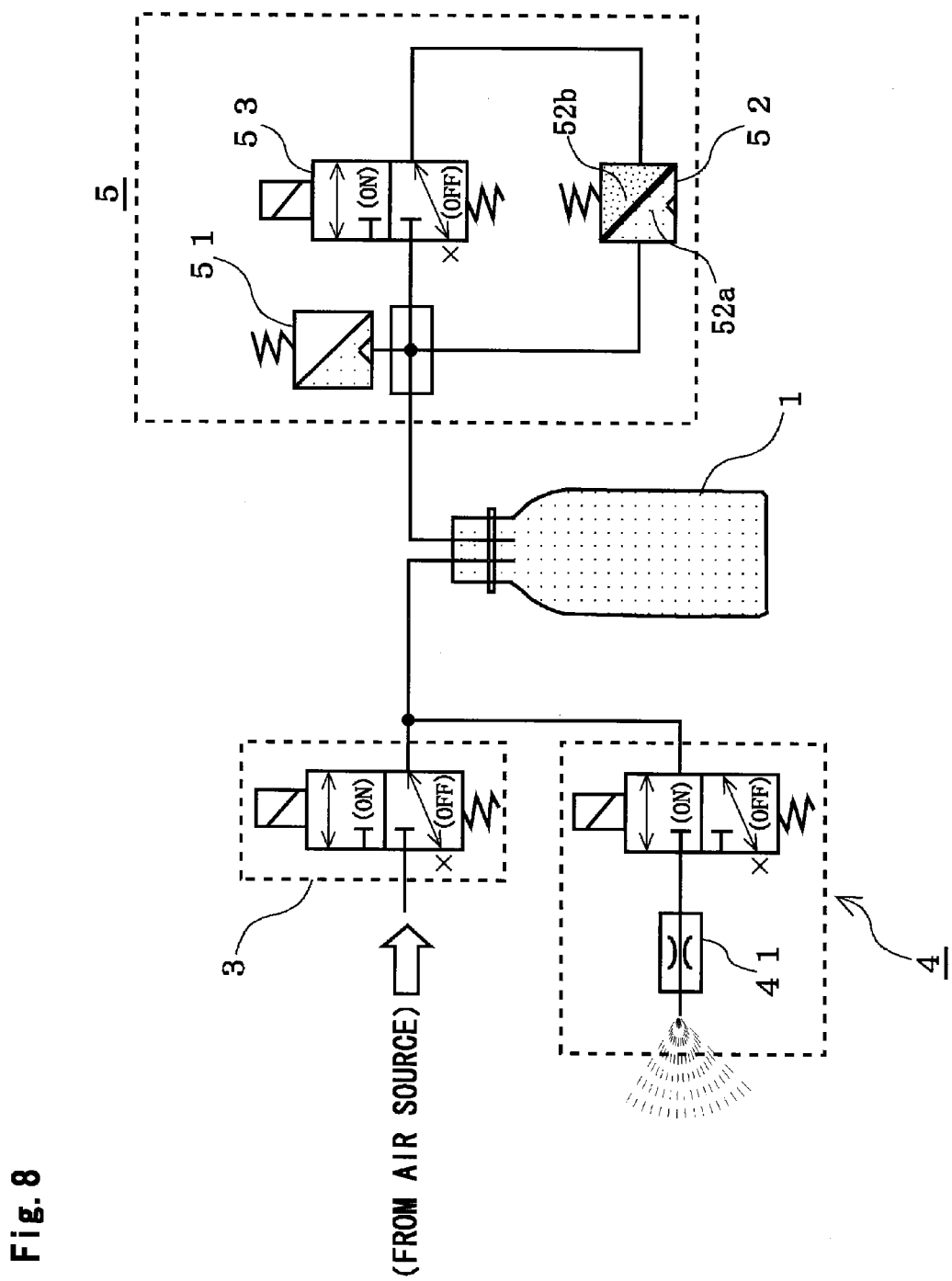
FIG. 8 is an explanatory drawing showing the operation of a pressure detection unit immediately after opening of a self-diagnostic valve in accordance with the present invention.

As shown in FIG. 8, in the case the indicated value of the differential pressure sensor 52 (pressure reduction quantity from the reference inner pressure) does not exceed the predetermined threshold value (the case no pinhole exists in the bottle), the controller 9 opens (switches ON) the self-diagnostic valve 4. As a result, air gradually flows out from the bottle 1 through the orifice 41 and a state of a pseudo leak is formed as if air was leaking from a pinhole in the bottle 1.

According to the pinhole inspection unit 120 as described above, the pinhole detection accuracy of the inspection system itself can be suitably confirmed without placing a test piece containing a pseudo pinhole on the transfer line instead of the bottle 1. As a result, both labor and time involved in placing the test piece on the transfer line, including test piece production, can be completely eliminated. In addition, a pseudo leak is formed in the bottle 1 by the orifice 41 of the self-diagnostic valve 4 provided in the gas supply line of the bottle 1, whereby confirmation of pinhole detection accuracy no longer comes to be dependent on the number of inspections. In addition, pseudo leaks can easily be formed in the bottle 1 by the orifice 41 of the self-diagnostic valve 4, such a trouble concerning a bottle rejection mechanism can be easily discovered as in the case the bottle 1 is not rejected when the self-diagnostic valve 4 is open (ON). In this manner, the inspection accuracy of the inspection system itself (absence of deterioration of the inspection function thereof) can be suitably confirmed, whereby improving the quality of pinhole inspections.

Figure 9:
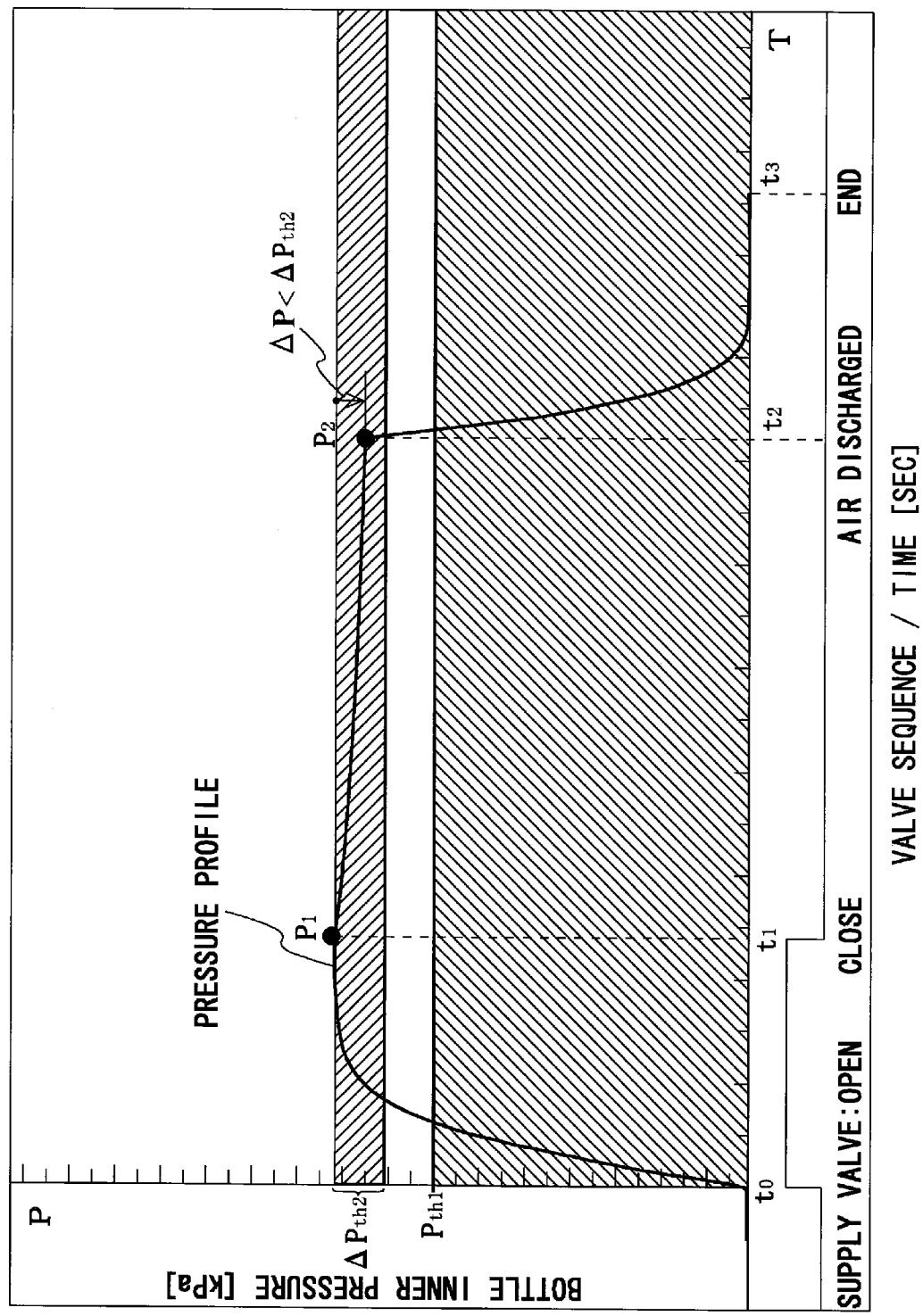
FIG. 9 is a graph showing an example of judging a bottle to be acceptable in a pinhole inspection unit in accordance with the present invention.

FIG. 9 is a graph showing an example of judging a bottle to be acceptable in the pinhole inspection unit 120 in accordance with the present invention.

When the supply valve 3 is opened at a time $T=t_0$, air is supplied inside the bottle and the inner pressure of the bottle rises rapidly. This is exactly equivalent to the state shown in FIG. 5.

When a predetermined amount of air is supplied to the bottle 1, the supply valve 3 closes at a time $T=t_1$. This is exactly equivalent to the state shown in FIG. 6. Here, a check is made as to whether or not an inner pressure $P_1$ (reference inner pressure) immediately after the supply valve 3 is closed exceeds a first threshold value $P_{th1}$. In the case the bottle inner pressure $P_1$ exceeds the first threshold value $P_{th1}$, the bottle 1 is held for a fixed amount of time and a pressure reduction quantity $\Delta P$ from the reference inner pressure is measured.

The pressure reduction quantity $\Delta P$ is determined from a differential pressure $\Delta P=P_1-P_2$ between the reference inner pressure $P_1$ and a bottle inner pressure $P_2$ after a fixed amount of time has elapsed, namely immediately before the pressure head 11 is moved away from the bottle mouth. However, each pressure value P1 and P2 is not determined separately, but rather the pressure reduction quantity $\Delta P$ is measured by the differential pressure sensor 52. The bottle is then judged to be acceptable in the case the measured pressure reduction quantity $\Delta P$ does not exceed a second threshold value $\Delta P_{th2}$.

At a time $T=t_2$, the pressure head 11 is moved away from the bottle mouth and the air in the bottle 1 is discharged, to complete pinhole inspection.

In this manner, the judgment is first made as to whether or not the reference inner pressure $P_1$ exceeds the first threshold value $P_{th1}$. In the case of $P_1>P_{th1}$, the judgment proceeds to the next inspection of the pressure reduction quantity, and the inspection is made as to whether or not the pressure reduction quantity $\Delta P$ from immediately after the supply valve 3 is closed exceeds the second threshold value $\Delta P_{th2}$. The bottle is then judged to be free of pinholes and acceptable only in the case the pressure reduction quantity $\Delta P$ is within the range of the second threshold value $\Delta P_{th2}$. An example of a value of the first threshold value $P_{th1}$ is 8 kPa. In addition, an example of a value of the second threshold value $\Delta P_{th2}$ is 3 kPa. In addition, the reference inner pressure $P_1$ is, for example, 15 to 20 kPa.

Figure 10:
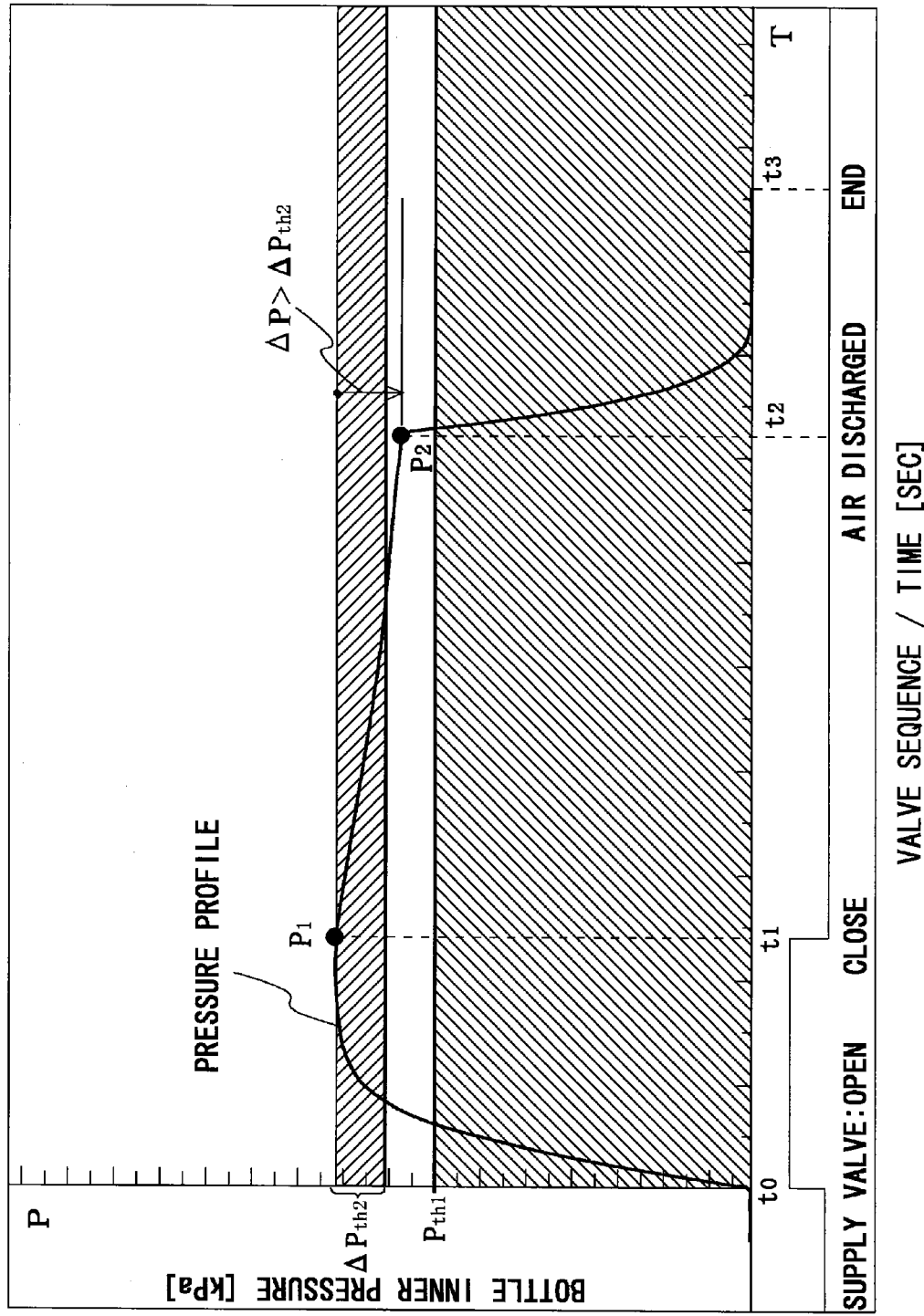
FIG. 10 is a graph showing an example of judging a bottle to be unacceptable in a pinhole inspection unit in accordance with the present invention.

FIG. 10 is a graph showing an example of judging a bottle to be unacceptable in the pinhole inspection unit 120 in accordance with the present invention.

In the case of this bottle, although the reference inner pressure $P_1$ exceeds the first threshold value $P_{th1}$, the pressure reduction quantity $\Delta P$ exceeds the second threshold value $\Delta P_{th2}$. Thus, this bottle is considered to contain a pinhole and is judged to be unacceptable.

Figure 11:
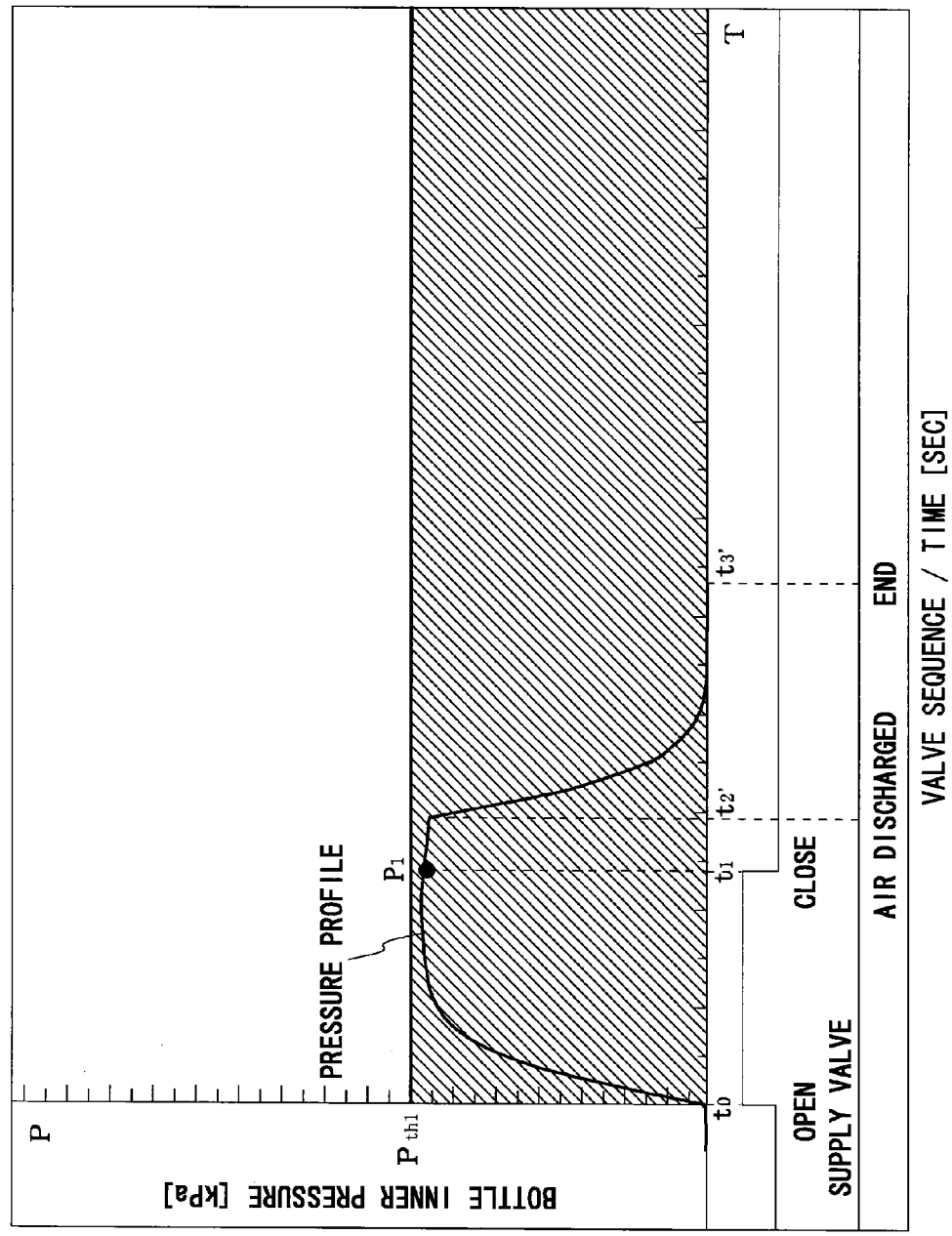
FIG. 11 is a graph showing an example of judging a bottle to be unacceptable in a pinhole inspection unit in accordance with the present invention.

FIG. 11 is a graph showing an example of judging a bottle to be unacceptable in the pinhole inspection unit 120 in accordance with the present invention.

In the case of this bottle, the reference inner pressure $P_1$ does not clear the first threshold value $P_{th1}$. Thus, this bottle is considered to contain a pinhole and is judged to be unacceptable. After a short time, the pressure head 11 is moved away from the bottle mouth and pinhole inspection ends without maintaining the pressure inside the bottle and without measuring the pressure reduction quantity $\Delta P$.

According to the pinhole inspection method as described above, the first threshold value $P_{th1}$ is set for the reference inner pressure $P_1$ equivalent to the bottle inner pressure immediately after sealing air therein, and in the case that reference inner pressure $P_1$ does not exceed the first threshold value $P_{th1}$, the bottle is judged to be unacceptable without measuring the pressure reduction quantity $\Delta P$. In addition, even in the case the reference inner pressure $P_1$ exceeds the first threshold value $P_{th1}$, in the case the pressure reduction quantity $\Delta P$ exceeds the second threshold value $\Delta P_{th2}$, the bottle is judged to be unacceptable. In other words, the bottle is only judged to be acceptable in the case the reference inner pressure $P_1$ of the bottle 1 immediately after the supply valve 3 is closed exceeds the first threshold value $P_{th1}$, and the pressure reduction quantity $\Delta P$ from the reference inner pressure $P_1$ does not exceed the second threshold value $\Delta P_{th2}$. Thus, the pinhole inspection method can reliably reject the bottles containing pinholes for which there was the risk of being judged as acceptable in conventional pinhole inspection methods, whereby improving pinhole inspection accuracy.

In the above-mentioned embodiments, the presence of a pinhole is detected in the above-mentioned embodiments by using a pinhole inspection method based on the pressure within a bottle immediately after sealing air inside and a pressure reduction quantity after the passage of a fixed amount of time. In the case of thin-walled bottles and other bottles having low tensile strength, the presence of a pinhole can also be detected according to the amount of elongation of the bottle in the axial direction thereof after the passage of a fixed amount of time after sealing air in the bottle. That is, the bottle shows elongation in the axial direction proportional to an increase in inner pressure if a pinhole is not present in the bottle. In the case a pinhole is present, the bottle inner pressure either does not increase or, if any, only increases slightly. As a result, the bottle does not show elongation in the axial direction or only slight elongation in the axial direction. Thus, by measuring a length $L_0$ of the bottle in the axial direction prior to sealing air inside and a length $L$ of the bottle in the axial direction after a fixed amount of time has elapsed, calculating the amount of elongation $\Delta L = L - L_0$, and setting a threshold value of, for example, 1.0% for the elongation percentage $= \Delta L/L_0 \times 100\%$ in the axial direction based on the length $L_0$ of the bottle in the axial direction prior to sealing air inside, a bottle can be judged to be free of pinholes if the elongation percentage is equal to or greater than that threshold value, or can be judged to contain a pinhole if the elongation percentage is less than that threshold value. Furthermore, a known position sensor or distance sensor can be used as means of measuring the amount of elongation of the bottle in the axial direction.

In addition, the amount of elongation of the bottle in the axial direction is preferably measured while inhibiting (restricting) deformation of the bottle in the radial direction. An example of a body support means that inhibits deformation of the bottle in the radial direction is a hollow cylindrical housing. Furthermore, the lateral surface of this cylinder is preferably not completely closed. This is because, if the lateral surface is completely closed, in the case a pinhole is present in the body of the bottle, the pinhole ends up being covered by the lateral surface of the cylinder, whereby preventing the pinhole from being detected. An example of a support means in which the lateral surface thereof is not completely closed is a cage-type cylindrical housing in which a large number of slits (cutouts), which are parallel in the axial direction, are formed in the lateral surface thereof.

Practical Example 1

Figure 12:
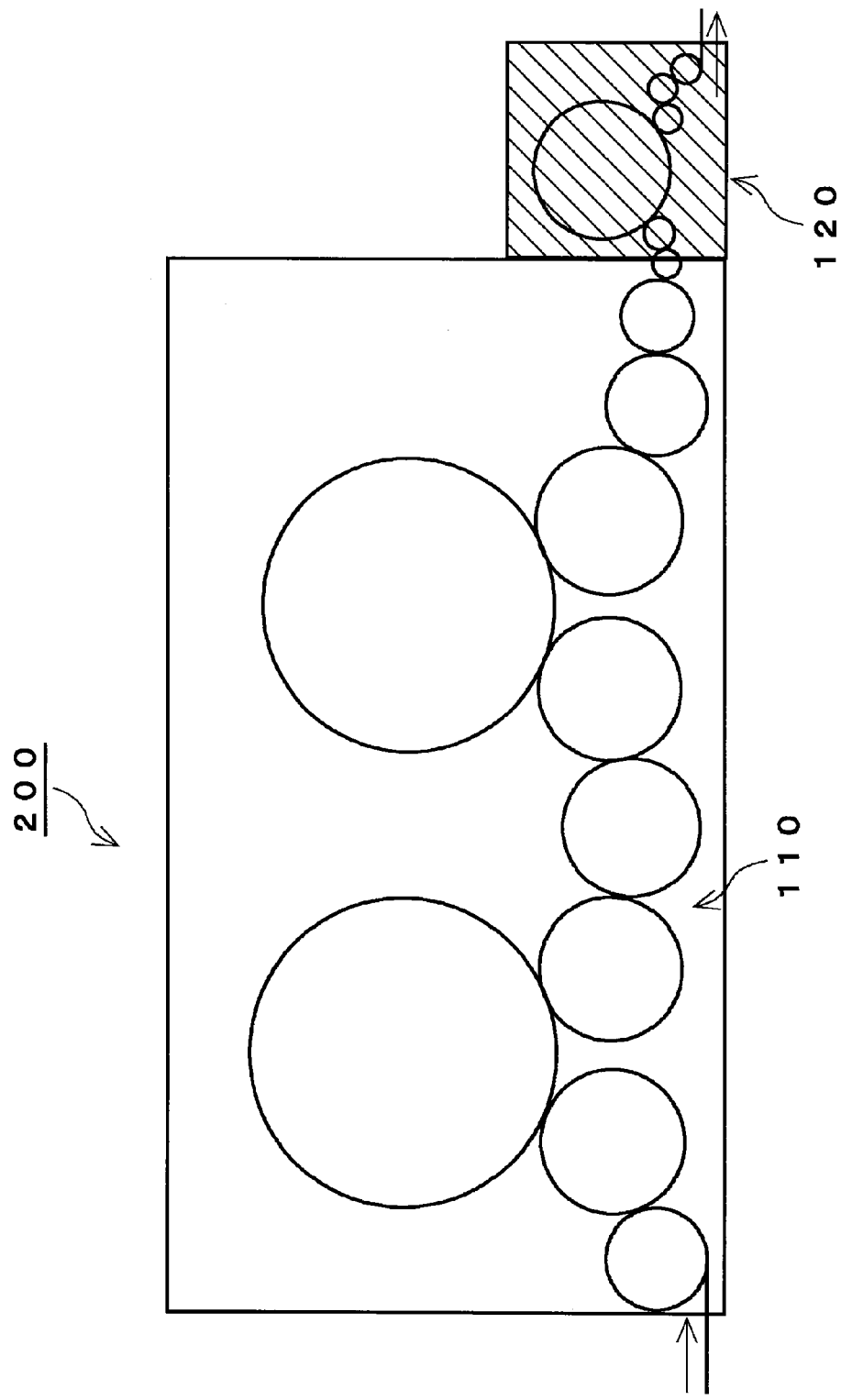
FIG. 12 is an explanatory block diagram showing a blow molding machine equipped with a pinhole inspection function in accordance with Practical Example 1.
Figure 13:
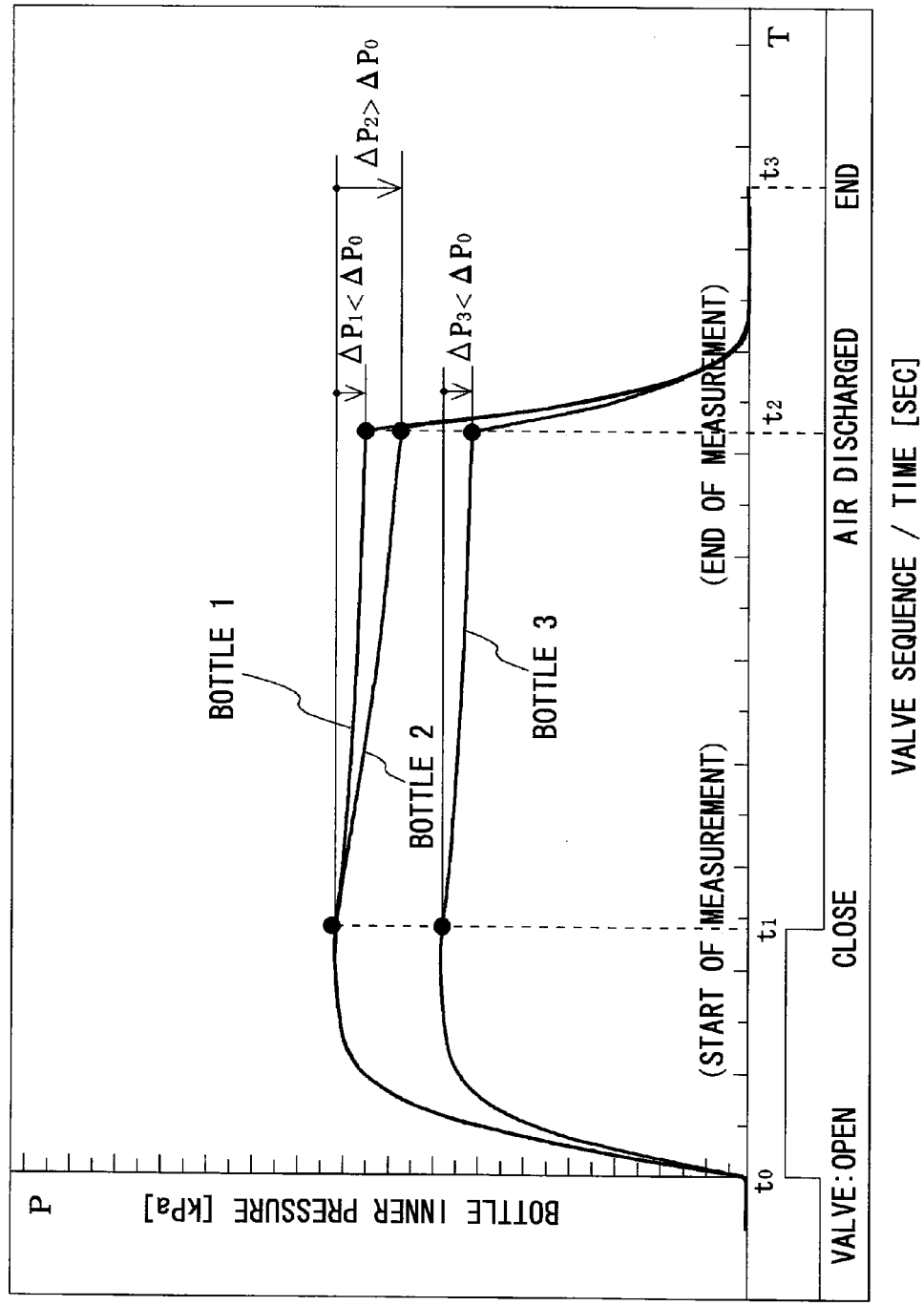
FIG. 13 is a graph showing a pinhole inspection method of prior arts that detects the presence of pinholes of bottles by a pressure reduction quantity.

FIG. 12 is an explanatory block diagram showing the blow molding machine 200 equipped with a pinhole detection function according to Practical Example 1.

This blow molding machine 200 equipped with a pinhole inspection function has the pinhole inspection unit 120 added to the vicinity of the exit of the blow molding unit 110, and is synchronized and integrated with the blow molding unit 110 while sharing a common drive mechanism therewith. Furthermore, blow-molded bottles are transferred to the pinhole inspection unit 120 by grippers that rotate in synchronization with the blow molding machine without going through a conveyor or timing screw. In this case, the space occupied by the entire production line, including sterilization and filling systems, can be reduced and equipment can be made more compact in the same manner as the previously described blow molding machine 100 equipped with a pinhole inspection function.

In addition, although air is used for the gas to detect pinholes in the above-mentioned embodiments, the gas is not limited to air, but rather an inert gas such as helium or nitrogen or a mixture of an inert gas with air may also be used.

INDUSTRIAL APPLICABILITY

The method and apparatus for inspecting for pinholes in synthetic resin bottles of the present invention can be preferably applied to a pinhole inspection method for container and the pinhole inspection apparatus that detects the presence of pinholes in the container by sealing a gas inside the container and measuring the amount of a reduction in the container inner pressure after a fixed amount of time has elapsed.

The invention claimed is:
1. A pinhole inspection apparatus, comprising
a gas supply line supplying a predetermined amount of gas into a bottle,
a pressure detection line for measuring an inner pressure of the bottle,
a branch line provided at an intermediate location of the gas supply line or the pressure detection line of the bottle, and
an orifice serving as a pseudo pinhole connected to the branch line via a valve, wherein the pinhole inspection apparatus determines a reduction of the inner pressure of the bottle after a mouth of the bottle is sealed and a fixed time has elapsed, wherein the orifice is provided with a variable hole diameter, and wherein the pressure detection line measures an inner pressure of the bottle as a reference inner pressure immediately after sealing the gas, and the pinhole inspection apparatus determines the bottle to be free of a pinhole and acceptable only in a case where the reference inner pressure exceeds a predetermined first threshold value and the pressure reduction quantity does not exceed a predetermined second threshold value.

2. The pinhole inspection apparatus according to claim 1, wherein the pinhole inspection apparatus is so configured as to be integrated with a blow molding machine that manufactures a bottle by biaxial stretch blowing method.

3. The pinhole inspection apparatus according to claim 2, wherein the pinhole inspection apparatus and the blow molding machine are so integrated as to be connected by a plurality of rotating wheels driven by same drive mechanism.

4. A pinhole inspection apparatus, comprising a gas supply line supplying a predetermined amount of gas into a bottle, a pressure detection line for measuring an inner pressure of the bottle, a branch line provided at an intermediate location of the gas supply line or the pressure detection line of the bottle, and an orifice serving as a pseudo pinhole connected to the branch line via a valve, wherein the pinhole inspection apparatus determines a reduction of the inner pressure of the bottle after a mouth of the bottle is sealed and a fixed time has elapsed, wherein a member of the orifice that forms a portion of a flow path of the branch line is provided replaceable in the branch line, and wherein the pressure detection line measures an inner pressure of the bottle as a reference inner pressure immediately after sealing the gas, and the pinhole inspection apparatus determines the bottle to be free of a pinhole and acceptable only in a case where the reference inner pressure exceeds a predetermined first threshold value and the pressure reduction quantity does not exceed a predetermined second threshold value.

* * * * *